US010981332B2

(12) United States Patent
Chanclon et al.

(10) Patent No.: US 10,981,332 B2
(45) Date of Patent: Apr. 20, 2021

(54) ADDITIVE MANUFACTURING MATERIAL MANAGEMENT STATION

(71) Applicant: HEWLETT-PACKARD DEVELOPMENT COMPANY, L.P., Houston, TX (US)

(72) Inventors: Ismael Chanclon, Sant Cugat del Valles (ES); Xavier Alonso, Sant Cugat del Valles (ES); Jorge Castano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 77 days.

(21) Appl. No.: 16/096,179

(22) PCT Filed: May 12, 2016

(86) PCT No.: PCT/EP2016/060651
§ 371 (c)(1),
(2) Date: Oct. 24, 2018

(87) PCT Pub. No.: WO2017/194108
PCT Pub. Date: Nov. 16, 2017

(65) Prior Publication Data
US 2019/0118475 A1 Apr. 25, 2019

(51) Int. Cl.
*B29C 64/321* (2017.01)
*B33Y 30/00* (2015.01)
(Continued)

(52) U.S. Cl.
CPC .......... *B29C 64/321* (2017.08); *B22F 3/004* (2013.01); *B22F 10/00* (2021.01); *B29C 64/20* (2017.08);
(Continued)

(58) Field of Classification Search
CPC ..... B33Y 40/00; B29C 64/321; B29C 64/307; B29C 64/314; B29C 64/336; G03G 15/0863; G03G 21/1875–1896
See application file for complete search history.

(56) References Cited

U.S. PATENT DOCUMENTS 6,022,207 A * 2/2000 Dahlin .................. B29C 64/106
425/145
6,776,602 B2 * 8/2004 Swanson ............... B29C 64/118
425/376.1
(Continued)

FOREIGN PATENT DOCUMENTS

CN 101539745 9/2009
CN 204036857 12/2014
(Continued)

OTHER PUBLICATIONS

Hamed Sanogo; Secure 3D Printing—The New Disruptive Technology—and Watch the Market Grow; Apr. 22, 2015; https://www.maximintegrated.com/en/app-notes/index.mvp/id/5940.

*Primary Examiner* — Marc C Howell
*Assistant Examiner* — John J Derusso
(74) *Attorney, Agent, or Firm* — HP Inc. Patent Department

(57) ABSTRACT

An additive manufacturing material management station, comprising: a build material supply conduit (382, 582) with a build material supply connector (385, 585) to releasably connect between a management station body and a build material supply container to couple a flow of a fluid carrying a building material supply from within the supply container to the management station body; and a station data processor, wherein the supply connector comprises: a connector body; a suction nozzle (597) projecting from the connector body to form a mating fit with an outlet of a build material supply container in use; and a data communicator to provide
(Continued)

data communication between the station data processor and a data memory chip (394) of the supply container (314).

15 Claims, 10 Drawing Sheets

(51) Int. Cl.
*B33Y 50/02* (2015.01)
*B33Y 40/00* (2020.01)
*B29C 64/20* (2017.01)
*B29C 64/393* (2017.01)
*B22F 3/00* (2021.01)
*B22F 10/00* (2021.01)
*B22F 3/105* (2006.01)
*G03G 15/08* (2006.01)
*B22F 10/10* (2021.01)

(52) U.S. Cl.
CPC ............ *B29C 64/393* (2017.08); *B33Y 30/00* (2014.12); *B33Y 40/00* (2014.12); *B33Y 50/02* (2014.12); *B22F 10/10* (2021.01); *G03G 15/0822* (2013.01); *Y02P 10/25* (2015.11)

(56) References Cited

U.S. PATENT DOCUMENTS

| | | | |
|---|---|---|---|
| 7,037,382 | B2 | 5/2006 | Davidson et al. |
| 2004/0172160 | A1 | 9/2004 | O'Dougherty et al. |
| 2006/0091199 | A1 | 5/2006 | Loughran |
| 2007/0075459 | A1* | 4/2007 | Reynolds ............... B33Y 30/00 264/401 |
| 2009/0232526 | A1 | 9/2009 | Yoneda et al. |
| 2010/0140852 | A1* | 6/2010 | Kritchman ............ B33Y 30/00 264/494 |
| 2015/0037050 | A1 | 2/2015 | Kimura et al. |
| 2016/0023886 | A1* | 1/2016 | Braden ................. B29C 64/393 |
| 2017/0136545 | A1* | 5/2017 | Yoshimura ............... B22F 3/24 |
| 2017/0285617 | A1* | 10/2017 | Sunata .................. B29C 64/106 425/145 |
| 2019/0134901 | A1* | 5/2019 | Douglas ................ B29C 64/393 |

FOREIGN PATENT DOCUMENTS

| | | |
|---|---|---|
| CN | 104723564 | 6/2015 |
| WO | WO-9840703 A1 | 9/1998 |
| WO | WO-2004044816 A1 | 5/2004 |
| WO | WO-2015185155 A1 | 12/2015 |

* cited by examiner

| | Valve | | | | | | | | | | | |
|---|---|---|---|---|---|---|---|---|---|---|---|---|
| | 250 | 244 | 256 | 276 | 248 | 258 | 242 | 262 | 260 | 254 | 252a | 252b |
| Recovered build material tank to mixing tank | | | ✓ | | | | | | | | | |
| Fresh build material supply tank 214a to mixing tank | | ✓ | | | | | | | | ✓ | ✓ | |
| Fresh build material supply tank 214b to mixing tank | | | | | | | | | | ✓ | | ✓ |
| Unload mixing tank | | | | | | | | | ✓ | | | |
| Working area to recovered build material tank | | | | ✓ | ✓ | | ✓ | | | | | |
| Working area to overflow tank | | | | ✓ | ✓ | | | | | | | |
| Overflow tank to recovered build material tank | ✓ | | | | | ✓ | | | | | | |
| Empty powder trap 220 | | | | | | ✓ | | ✓ | | | | |
| Purge process | | ✓ | ✓ | | | | | | ✓ | | | |

Figure 2B

ADDITIVE MANUFACTURING MATERIAL MANAGEMENT STATION

BACKGROUND

Additive manufacturing (3D printing) usually uses a supply of fresh build material, for example powder, which may be supplied in a container.

BRIEF DESCRIPTION OF THE DRAWINGS

FIG. 2B is a table schematically illustrating valve setting information for the material management station internal circuit of FIG. 2A;

DETAILED DESCRIPTION

Figure 1A:
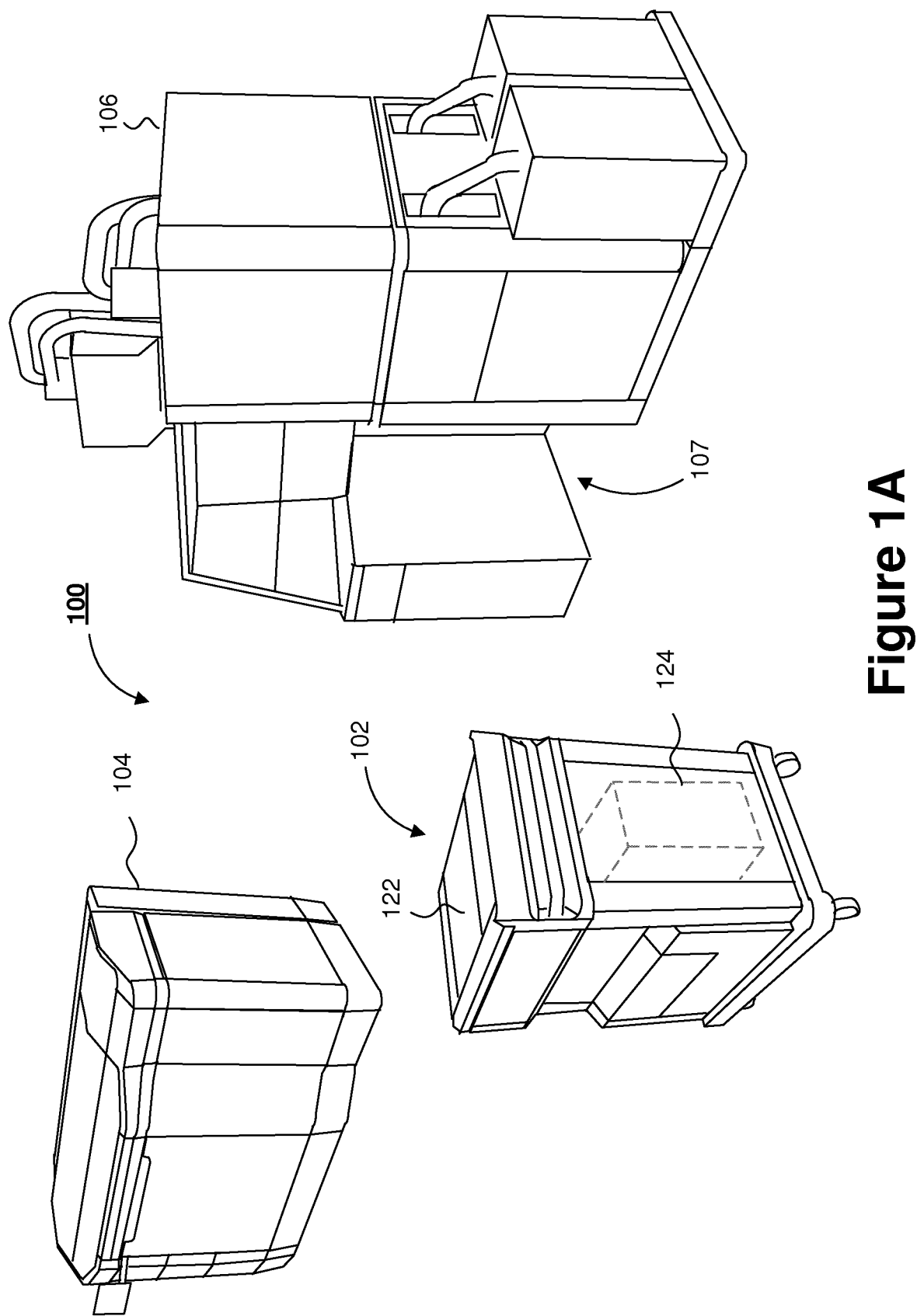
FIG. 1A schematically illustrates an example of a three dimensional (3D) printing system.

As shown in FIG. 1A, the three dimensional (3D) printing system 100 (or additive manufacturing system) according to one example comprises: a trolley 102, a 3D printer 104 and a material management station 106. The material management station 106 manages build material.

The trolley 102 is arranged to slot into a docking position in the printer 104 to allow the printer 104 to generate a 3D object within the trolley. The trolley is also arranged to also slot (at a different time) into a docking position 107 in the material management station 106. The trolley 102 may be docked in the material management station 106 prior to a 3D printing process to load the trolley with build material in preparation for a subsequent 3D printing process.

The build material loaded into the trolley may include recycled or recovered build material from one or more previous printing processes, fresh build material or a portion of fresh and recycled build material. Some build materials may be non-recyclable and hence in this case no recovered build material will be used to load the trolley. The build material may be or include, for example, powdered metal materials, powdered composited materials, powder ceramic materials, powdered glass materials, powdered resin material, powdered polymer materials and the like. In some examples where the build material is a powder-based build material, the term powder-based materials is intended to encompass both dry and wet powder-based materials, particulate materials and granular materials. It should be understood that the examples described herein are not limited to powder-based materials, and may be used, with suitable modification if appropriate, with other suitable build materials. In other examples, the build material may be in the form of pellets, or any other suitable form of build material, for instance.

Returning to FIG. 1A, the trolley 102 may also be docked in the docking position 107 in the material management station 106 (shown without the trolley 102 docked in FIG. 1A) to clean up at least some components of the trolley 102 after it has been used in a 3D printing production process. The clean-up process may involve recovery and storage in the material management station 106 of unfused build material from the previous print job for subsequent reuse. During a 3D printing process a portion of the supplied build material may be fused to form the 3D object, whilst a remaining portion of the supplied build material may remain unfused and potentially recyclable, depending upon the type of build material used. Some processing of the unfused build material may be performed by the material management station 106 prior to storage for recycling, to reduce any agglomeration for example.

It will be understood that the material management station 106 may also include an access panel (not shown) to cover the docking position 107 when the trolley 102 is fully docked with the material management station 106 and when the trolley 102 is fully removed from the material management station 106.

One material management station 106 can be used to service one or more different 3D printers. A given 3D printer may interchangeably use one or more trolleys 102, for example, utilising different trolleys for different build materials. The material management station 106 can purge a trolley 102 of a given build material after a 3D printing production process, allowing it to be filled with a different build material for a subsequent 3D printing production run. Purging of the trolley 102 may also involve purging of the material management station 106 or alternatively, it may involve separation of different build materials in the material management station 106 to limit contamination of one build material type with another.

The trolley 102 in this example has a build platform 122 on which an object being manufactured is constructed. The trolley 102 also comprises a build material store 124 situated beneath a build platform 122 in this example. The build platform 122 may be arranged to have an actuation mechanism (not shown) allowing it, when it is docked in the printer 104 and during a 3D printing production process, to gradually move down, such as in a step-wise manner, towards the base of the trolley 102 as the printing of the 3D object progresses and as the build material store 124 within the trolley 102 becomes depleted. This provides progressively more distance between the base level of the build platform 122 and the print carriages (not shown) to accommodate the 3D object being manufactured. The size of an object being printed may increase progressively as it is built up layer-by-layer in the 3D printing process in this example.

The 3D printer 104 of this example can generate a 3D object by using a build material depositor carriage (not shown) to form layers of build material onto the build platform 122. Certain regions of each deposited layer are fused by the printer 104 to progressively form the object according to object-specifying data. The object-specifying data are based on a 3D shape of the object and may also provide object property data such as strength or roughness corresponding to the whole object or part(s) of the 3D object. In examples, the desired 3D object properties may also be supplied to the 3D printer 104 via a user interface, via a software driver or via predetermined object property data stored in a memory.

After a layer of the build material has been deposited on the build platform 122 by the printer 104, a page-wide array of thermal (or piezo) printheads on a carriage (not shown) of the 3D printer 104 can traverse the build platform 122 to selectively deposit a fusing agent in a pattern based on where particles of the build material are to fuse together. Once the fusing agent has been applied, the layer of build material may be exposed to fusing energy using one or more heating elements (not shown) of the 3D printer 104. The build material deposition, fusing agent and fusing energy application process may be repeated in successive layers until a complete 3D object has been generated. The material management station 106 may be used with any additive manufacturing technique and is not limited to printers using printheads on a carriage to deposit a fusing agent as in the example described above. For example, the material management station 106 may be used with a selective laser sintering additive manufacturing technique.

Figure 1B:
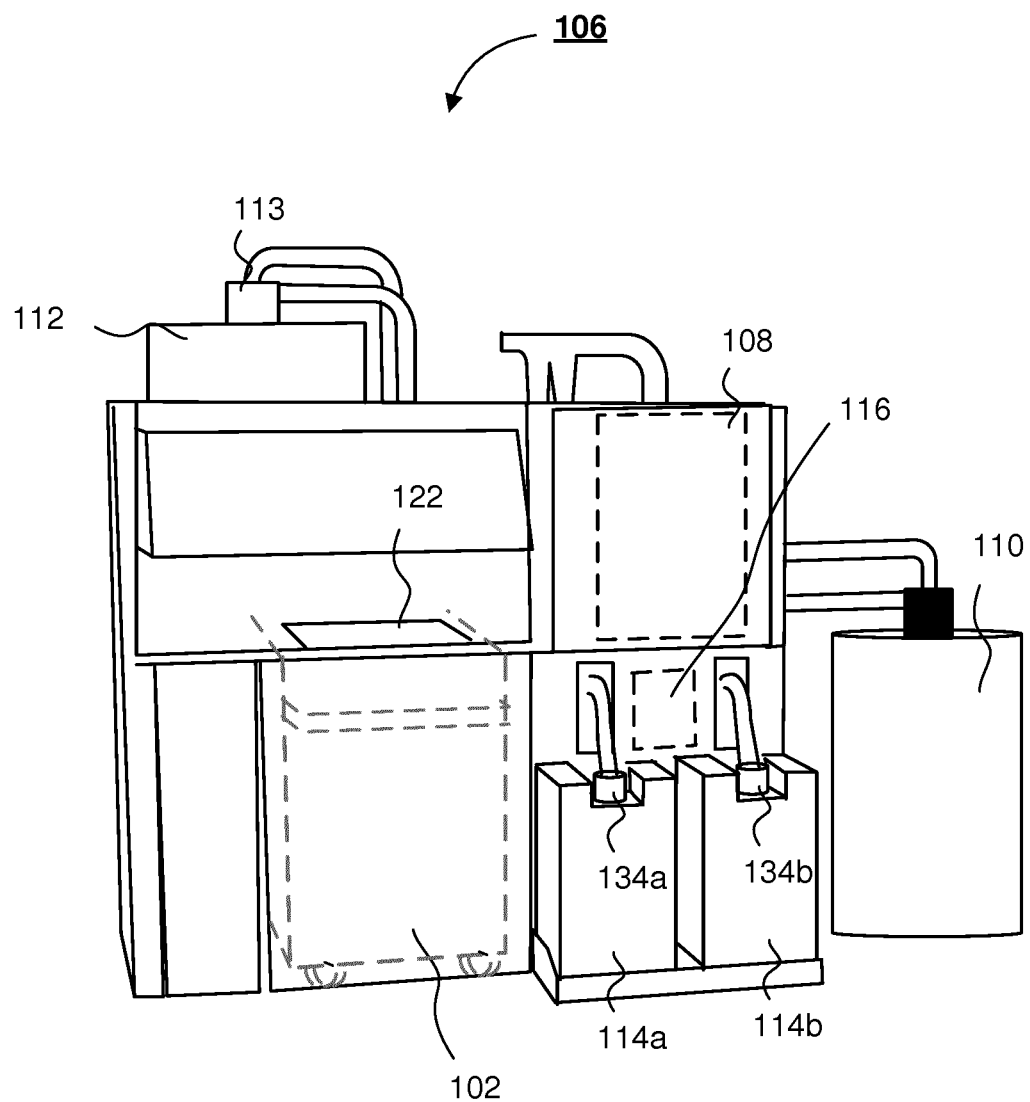
FIG. 1B schematically illustrates the material management station of the example of FIG. 1A.

FIG. 1B schematically illustrates the material management station 106 of the example of FIG. 1A, with the trolley 102 of FIG. 1A docked therein.

As shown in the example of FIG. 1B, the material management station 106 has two interfaces for receiving two fresh build material supply tanks (or cartridges) 114a, 114b, which may be releasably insertable in the material management station 106. In this example, each fresh build material supply tank 114a, 114b has a capacity of between about thirty and fifty litres. In one example, the build material may be a powdered semi-crystalline thermoplastic material. The provision of two fresh build material supply tanks 114a, 114b allows "hot swapping" to be performed such that if a currently active container becomes empty or close to empty of build material when the trolley 102 is being filled with build material by the material management station 106 in preparation for an additive manufacturing process, a fresh build material supply source can be dynamically changed to the other of the two tanks. The material management system 106 may have one or more weight measurement device(s) to assess how much fresh build material is present at a given time in one or more of the fresh build material supply tanks 114a, 114b. The fresh build material from the tanks 114a, 114b, may be consumed, for example, when loading the trolley 102 with build material prior to the trolley 102 being installed in the printer 104 for a 3D printing production run.

Build material is moved around within the material management station 106 in this example using a vacuum system (described below with reference to FIG. 2A), which promotes cleanliness within the system and allows for recycling of at least a portion of build material between successive 3D printing jobs, where the type of build material selected for use is recyclable. References to a vacuum system in this specification include a vacuum that is partial vacuum or a pressure that is reduced, for example, relative to atmospheric pressure. The vacuum may correspond to "negative pressure", which can be used to denote pressures below atmospheric pressure in a circuit surrounded by atmospheric pressure.

A total trolley-use time for printing of a 3D object before trolley 102 can be reused may depend upon both a printing time of the printer 104 when the trolley 102 is in the printer 104 and a cooling time of the contents of the build volume of the trolley 102. It will be understood that the trolley 102 can be removed from the printer 104 after the printing operation, allowing the printer 104 to be re-used for a further printing operation using build material within a different trolley before the total trolley-use time has elapsed. The trolley 102 can be moved to the material management station 106 at the end of the printing time. The vacuum system can be used, in some examples, to promote more rapid cooling of the contents of the build volume following a 3D print production process than would otherwise occur without the vacuum system. Alternative examples to the vacuum system such as a compressed air system can create excess dust, potentially making the clean-up process more difficult.

The material management station 106 in this example has a recovered build material tank 108 (see FIG. 1B), located internally, where build material recovered from the trolley 102 by the vacuum system is stored for subsequent reuse, if appropriate. Some build materials may be recyclable whilst others may be non-recyclable. In an initial 3D printing production cycle, 100% fresh build material may be used. However, on second and subsequent printing cycles, depending upon build material characteristics and user choice, the build material used for the print job may comprise a proportion of fresh build material (e.g. 20%) and a portion of recycled build material (e.g. 80%). Some users may elect to use mainly or exclusively fresh build material on second and subsequent printing cycles, for example, considering safeguarding a quality of the printed object. The internal recovered build material tank 108 may become full during a post-production clean-up process, although it may become full after two or more post-production clean up processes have been performed, but not before. Accordingly, an overflow tank in the form of an external overflow tank 110 can be provided as part of the material management station 106 to provide additional capacity for recovered build material for use once the internal recovered build material tank 108 is full or close to full capacity. Alternatively, the external overflow tank 110 can be a removable tank. In this example, one or more ports are provided as part of the material management station 106 to allow for output of or reception of build material to and/or from the external overflow tank 110. A sieve 116 or alternative build material refinement device may be provided for use together with the internal recovered build material tank 108 to make unfused build material recovered from a 3D printing production process for recycling more granular, that is, to reduce agglomeration (clumping).

The material management station 106 in this example has a mixing tank (or blending tank) 112 comprising a mixing blade (not shown) for mixing recycled build material from the internal recovered build material tank 108 with fresh build material from one of the fresh build material supply tanks 114a, 114b for supply to the trolley 102 when it is loaded prior to a printing production process. The mixing tank (or blending tank) 112, in this example, is provided on top of the material management station 106, above the location of the build platform 122 when the trolley 102 is docked therein. The mixing tank 112 is connected to a mixer build material trap 113 (described below with reference to FIG. 2A) for input of build material into the mixing tank 112.

The fresh build material supply tanks 114a, 114b, the external overflow tank 110 and the main body of the material management station 106 may be constructed to fit together in a modular way, permitting a number of alternative geometrical configurations for the fully assembled material management station 106. In this way, the material management station 106 is adaptable to fit into different housing spaces in a manufacturing environment.

The fresh build material supply tanks 114a, 114b may be releasably connected to the main body of the material management station 106 via respective supply tank connectors 134a, 134b. These supply tank connectors 134a, 134b may incorporate a security system to reduce the likelihood of unsuitable build material being used in the 3D printing system. In one example, suitable fresh build material supply tanks 114a, 114b are provided with a secure memory chip, which can be read by a chip reader (not shown) or other processing circuitry on the main body of the material management station 106 to verify the authenticity of any replacement supply tank (cartridge) 114a, 114b that has been installed. In this example, the chip reader may be provided on the supply tank connectors 134a, 134b and upon attachment of the fresh build material supply tanks 114a, 114b to the respective connector 134a, 134b, an electrical connection may be formed. The processing circuitry in the material management station 106 may also be used to write a measured weight of build material determined to be in the respective fresh build material supply tank(s) 114a, 114b onto the secure memory chip of the tank to store and/or update that value. Thus, the amount of authorised build material remaining in the fresh build material supply tank(s) 114a, 114b at the end of a trolley loading process can be recorded. This allows the withdrawal of particulate build material from the fresh build material supply tanks 114a, 114b, beyond the quantity with which it was filled by the manufacturer, to be limited. For example, in the case of a fresh build material supply tank 114a, 114b from which the tank manufacturer's authorised fresh build material has previously been completely withdrawn, this limits the withdrawal of further build material that may damage the printer or print quality, if the fresh build material supply tank were re-filled with alternative fresh build material.

The secure memory chip of the fresh build material supply tanks 114a, 114b can store a material type of the build material contained within the fresh build material supply tanks. In one example, the material type is the material (e.g. ceramic, glass, resin, etc.). In this way, the material management station 106 can determine the material type to be used by the material management station 106.

Figure 1C:
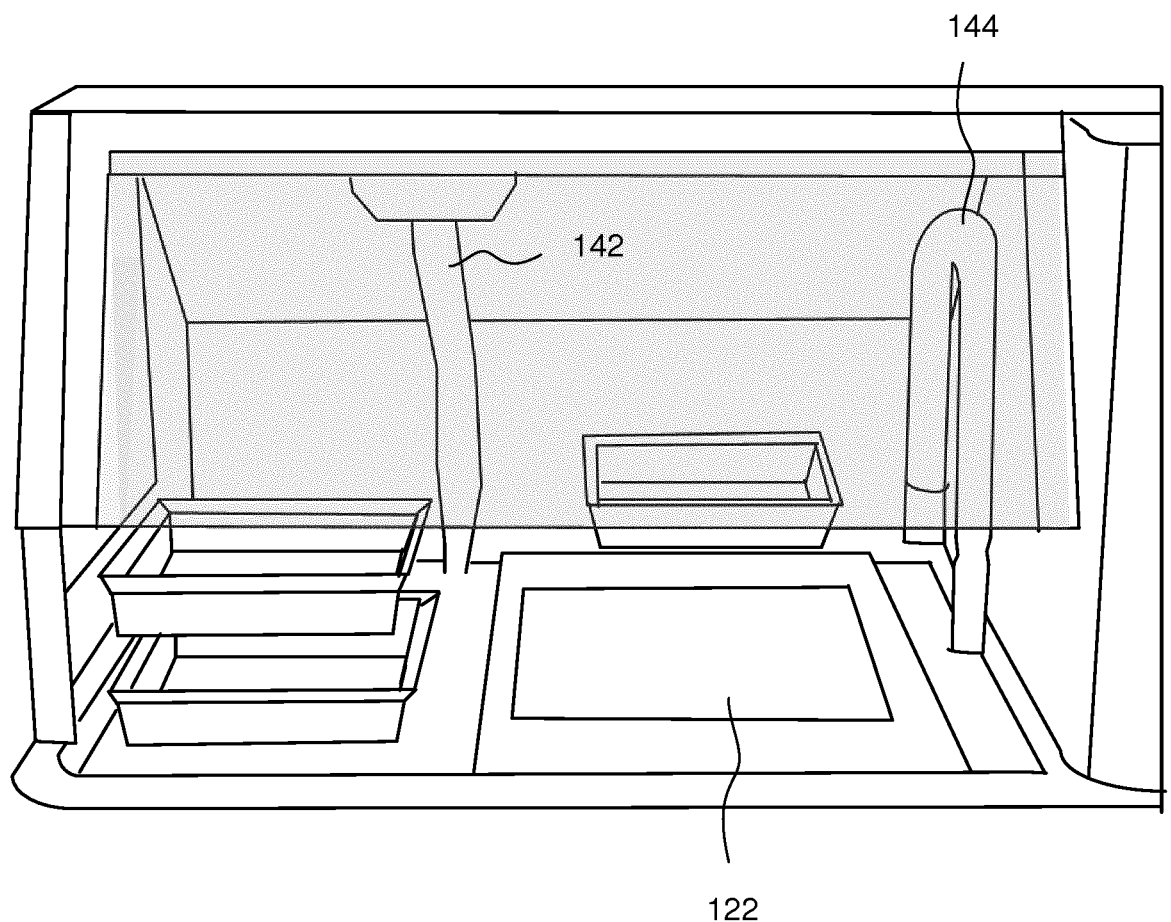
FIG. 1C schematically illustrates a working area of the material management station of the example of FIG. 1B.

FIG. 1C schematically illustrates a working area of the material management station 106 of the example of FIG. 1B, showing the build platform 122 of the trolley 102 and a build material loading hose 142, which provides a path between the mixing tank 112 of FIG. 1B and the build material store 124 of the trolley 102. The loading hose 142 is used for loading the trolley 102 with build material prior to the trolley 102 being used in the printer 104. FIG. 1C also shows a recycling hose 144 for unpacking manufactured 3D objects, cleaning the build platform 122 of the trolley 102 and a surrounding working area within the material management station 106. In one example, the recycling hose 144 operates by suction provided via a pump 204 (see FIG. 2A) and provides an enclosed path to the recovered build material tank 108 (see FIG. 1B) for receiving and holding build material for re-use in a subsequent 3D printing process. The recycling hose 144 may, in one example, be operated manually by a user to recover recyclable build material from and/or to clean up a working area of the material management station 106.

Figure 2A:
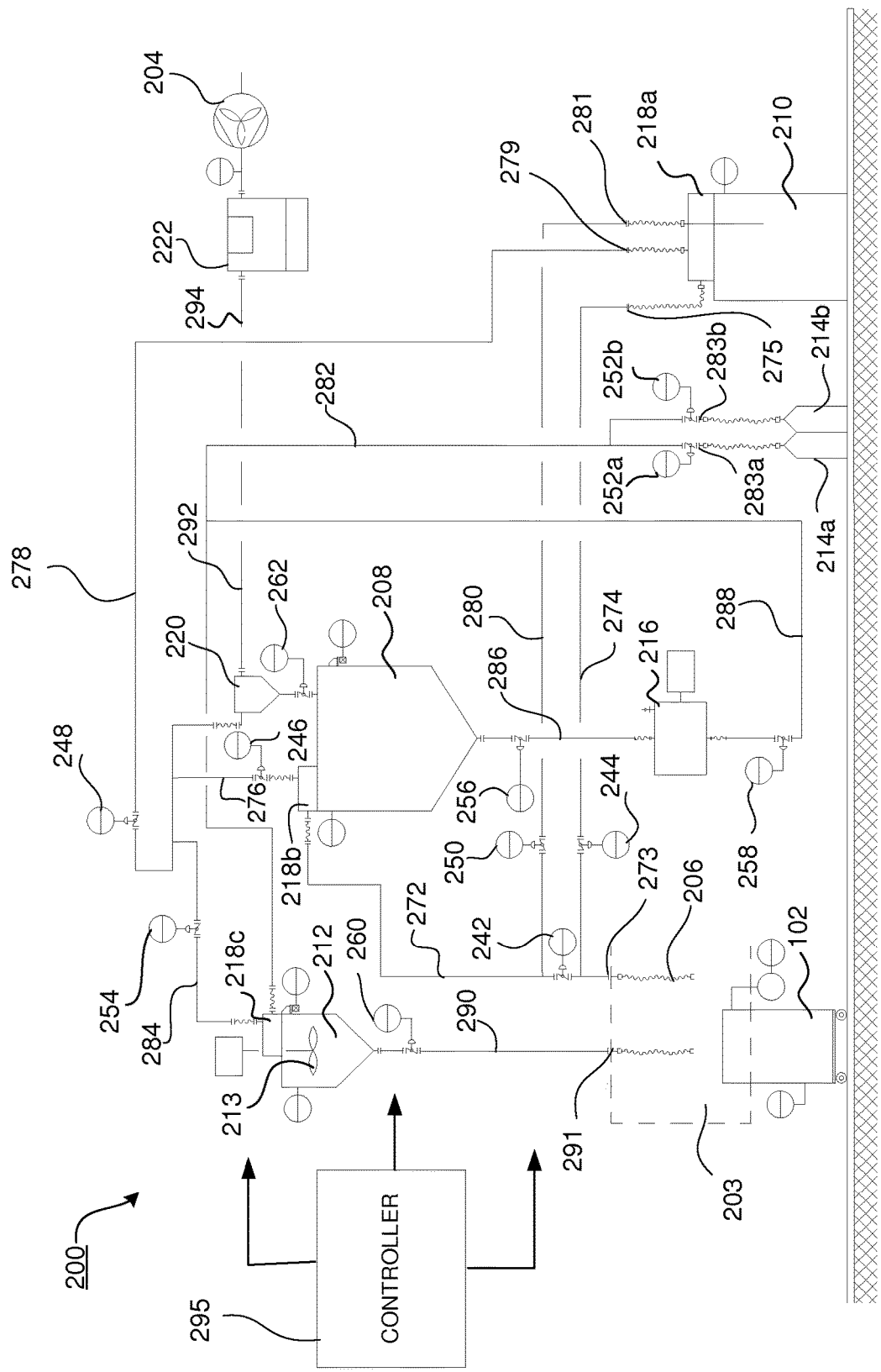
FIG. 2A schematically an internal circuit diagram of one example of a material management station.

FIG. 2A schematically illustrates an internal circuit diagram 200 of one example of a build material management system in the form of a material management station 106. The material management station 106 can be used in conjunction with the trolley 102 of FIG. 1A.

As previously described, printed parts along with unfused build material can be transported from the 3D printer 104 to the material management station 106 via the trolley 102. The material management station 106 can then be used to process build material and printed parts from the trolley 102.

In another example, printed parts along with unfused build material can be transported from the 3D printer 104 to the material management station 106 via another suitable container, e.g. a box or cartridge (not shown) instead of the trolley 102. The material management station 106 may then be used to process the powder-based material and printed parts from the container.

The material management station circuit 200 includes a conduit (or guide-channel) network and a pump 204 to provide a pressure differential across the conduit network to transport unfused build material between different components, as described below with reference to FIG. 2A. In this example, the pump 204 is a suction pump which operates to create a pressure differential across the suction pump to produce air flow from an air inlet at substantially atmospheric pressure through the conduit network towards an upstream side of the suction pump (at a pressure below atmospheric pressure or at "negative pressure"). The pump 204 may be provided as an integral part of the material management station 106 in one example, but in another example, the material management station 106 provides a negative/reduced pressure interface, via which a suction pump may be detachably coupled or coupled in a fixed configuration. Although the description below refers to first conduit, second conduit, third conduit, etc. of the conduit network, there is no implied ordering in the number of the conduits other than to distinguish one conduit from another.

A collection hose 206 is connected to a recovered build material tank (RBMT) 208 via a working area port in a working area 203 in the form of a working area inlet port 273 and a first conduit (hose-to-RBMT conduit) 272 of the conduit network. The recovered build material tank 208 includes a recovered build material tank (RBMT) inlet area comprising a recovered build material tank (RBMT) build material trap 218b and a recovered build material tank (RBMT) material outlet. The RBMT inlet area is where a fluidised flow of build material is received for storage in the recovered build material tank 208. The first conduit 272 provides a path between the working area inlet port 273 and the RBMT inlet area. The working area inlet port 273 is to receive build material from the collection hose 206 and is provided at an end of the first conduit 272 connected to the collection hose 206. In other examples, the RBMT inlet area may communicate directly with the working area 203 or the collection hose 206 without a first conduit 272 between.

The recovered build material tank 208 in this example is provided internally to the material management station 106. A hose-to-RBMT valve 242 is positioned along the first conduit 272 for opening and closing the path through the first conduit 272. The collection hose 206 extends from the working area inlet port 273 into the working area 203. The working area 203 includes at least a portion of the trolley 102 (or other container) and can be maintained at substantially atmospheric pressure. Build material from the trolley 102 can be collected by the collection hose 206 and transported to the recovered build material tank 208 through the first conduit 272. The recovered build material tank 208 can be used for storing any unfused build material from the trolley 102 that is suitable for being used again in a further 3D printing (additive manufacturing) process. In this way, the recovered build material tank 208 can be used as a buffer storage tank to temporarily store unfused build material prior to supplying the unfused build material for use in a further 3D printing (additive manufacturing) process.

A second conduit 274 (hose-to-overflow conduit) of the conduit network connects the collection hose 206 to an overflow tank 210. The overflow tank 210 includes an overflow inlet area and the second conduit 274 provides a path between the collection hose 206 and the overflow inlet area comprising, in this example, an overflow build material trap 218a (a filter). An overflow tank port in the form of an overflow tank outlet port 275 may also be provided at an end of the second conduit 274. The overflow tank 210 can be selectively sealed by an openable lid (not shown). In a sealed configuration, the overflow tank 210 is in fluid communication with one or more overflow inlet ports and overflow outlet ports of the conduit network. Furthermore, in the sealed configuration, the overflow tank 210 is not directly open to the atmosphere. Build material from the working area 203 can be transported through the second conduit 274 and overflow tank outlet port 275 into the overflow tank 210. A hose-to-overflow valve 244 is positioned along the second conduit 274 for opening and closing a path through the second conduit 274. Unfused build material from the trolley 102 (or other container) can be collected by the collection hose 206 and transported to the overflow tank 210 through the first conduit 272. The overflow tank 210 is an external tank that is removable and that can be used for storing excess recoverable (recyclable) build material when the recovered build material tank 208 is full. Alternatively, the overflow tank 210 can be used as a waste storage tank to store unfused build material from the trolley 102 that is not suitable for recycling. In a further alternative, the overflow tank 210 can be used as a purged build material storage tank to store unfused build material from the trolley 102 and from elsewhere in the material management station 106 when the material management station 106 is purged of unfused build material.

The pump 204 is connected via a third conduit (pump-to-RBMT conduit) 276 of the conduit network to the recovered build material tank 208. The third conduit 276 provides a path between the pump 204 and the RBMT inlet area. A RBMT-to-pump valve 246 is positioned along the third conduit 276 for opening and closing the path through the third conduit 276.

The pump 204 is also connected to the overflow tank 210 via a fourth conduit (pump-to-overflow conduit) 278 of the conduit network. The fourth conduit 278 provides a path between the pump 204 and the overflow inlet area. An overflow tank port in the form of an overflow tank vacuum port 279 may also be provided at an end of the fourth conduit 278. Fluid, e.g. air, can transmit through the overflow tank vacuum port 279 from the overflow inlet area towards the pump 204. An overflow-to-pump valve 248 is positioned along the fourth conduit 278 for opening and closing a path through the fourth conduit 278.

Unfused build material in the trolley 102 can be collected using the collection hose 206 and transported either to the recovered build material tank 208 or to the overflow tank 210, or both. The tank to be used at a given time can be selected by opening appropriate valves along the conduits of the circuit of FIG. 2A.

The valves described herein with reference to FIG. 2A may be controlled by a controller 295, which may be, for example a programmable logic controller forming a part of processing circuitry of the build material management station 106. The controller 295 may electronically open one or more valves to open one or more paths in respective conduits based on the material transport operation being performed. The controller 295 may also electronically close one or more valves to close one or more paths in respective conduits. The valves may be, for example, butterfly valves and may be actuated using compressed air. In another example, one or more valves may be opened and closed manually by a user.

The controller controls the general operation of the material management system 200. The controller may be a microprocessor-based controller that is coupled to a memory (not shown), for example via a communications bus (not shown). The memory stores machine executable instructions. The controller 295 may execute the instructions and hence control operation of the build material management system 200 in accordance with those instructions.

FIG. 2B is a table schematically illustrating for each of a number of different build material source locations and build material destination locations, an appropriate valve configuration corresponding the valves as labelled in FIG. 2A. A tick in an appropriate column of the table indicates that the corresponding valve is controlled to be open by the controller 295 for the particular build material transport operation. For example, when transporting build material from the recovered build material tank 208 to the mixing tank 212, the valves 256, 258 and 254 are set by the controller 295 to be open, whereas the valves 250, 244, 276, 248, 242, 262, 260, 252a and 252b are set to be closed. In alternative examples, some valves may be set to be open by simultaneity.

In an example, a recyclability indicator is determined by processing circuitry of the build material management station 106. The recyclability indicator can be indicative of whether the build material in the trolley 102 (or container) includes recyclable or recoverable material. When it is determined that the unfused build material in the trolley 102 is not recyclable or when the recovered build material tank 208 is full, the unfused build material can be transported to the overflow tank 210.

To transport the unfused build material from the trolley 102 (or container) to the overflow tank 210, the hose-to-overflow valve 244 in the second conduit 274 between the collection hose 206 and the overflow tank 210 and the overflow-to-pump valve 248 in the fourth conduit 278 between the pump 204 and the overflow tank 210 can be opened, e.g. electronically by the controller 295. When the pump is active, a differential pressure is provided from the pump to the collection hose 206. That is, a pressure at the pump 204 is lower than a pressure at the collection hose 206. The differential pressure enables build material from the trolley 102 (or container) to be transported to the overflow tank 210. Build material (and air) in proximity with an end of the collection hose 206 (at approximately atmospheric pressure) is transported from the collection hose 206, along the second conduit 274 and through the hose-to-overflow valve 244 to overflow tank 210. The overflow tank 210 is provided in the sealed configuration. At the overflow tank 210, build material separates from air flow and drops from the overflow inlet area into the overflow tank 210. Air (and any residual build material) continues along the fourth conduit 278 and through the overflow-to-pump valve 248 towards the pump 204, which is at a reduced pressure.

To help limit unfused build material traveling through the overflow inlet area of the overflow tank 210 into the fourth conduit 278 towards the pump 204, the overflow inlet area can include an overflow build material trap 218a (e.g. a powder trap). The overflow build material trap 218a is arranged to collect build material from the second conduit 274 and divert the build material (e.g. powder) into the overflow tank 210. Thus, the overflow build material trap 218a helps limit build material conveying past the overflow inlet area of the overflow tank 210 and entering the fourth conduit 278 via the overflow tank vacuum port 279 to travel towards the pump 204.

The overflow build material trap 218a may include a filter (e.g. a mesh), which collects build material transported from the overflow tank 210. Thus, the filter separates build material from air flow in the overflow inlet area. Holes in the filter are small enough to limit the passage of at least 95% of build material but allow relatively free flow of air through the filter. Holes in the filter may be small enough to limit the passage of at least 99% of build material, whilst still allowing relatively free flow of air through the filter. Build material collected by the filter may drop from the overflow inlet area into the overflow tank 210.

Recoverable unfused build material in the trolley 102 (or container) can be transported to the recovered build material tank 208 in a similar way. To transport the unfused build material from the trolley 102 to the recovered build material tank 208, the hose-to-RBMT valve 242 in the first conduit 272 between the collection hose 206 and the recovered build material tank 208 and the RBMT-to-pump valve 246 in the third conduit 276 between the pump 204 and the recovered build material tank 208 can be opened electronically by the controller 295 as described above. When the pump is active, a differential pressure is provided from the pump to the collection hose 206. That is, a pressure at the pump 204 is lower than a pressure at the collection hose 206. The differential pressure enables build material from the trolley 102 (or container) to be transported to the recovered build material tank 208. Build material (and air) in proximity with an end of the collection hose 206 (at approximately atmospheric pressure) is transported from the collection hose 206, along the first conduit 272 and through the hose-to-RBMT valve 242 to the recovered build material tank 208. At the recovered build material tank 208, build material separates from air flow and drops from the RBMT inlet area into the recovered build material tank 208. Air (and any residual build material) continues along the third conduit 276 and through the RBMT-to-pump valve 246 towards the pump 204, which is at reduced pressure relative to atmospheric pressure.

Figure 2C:
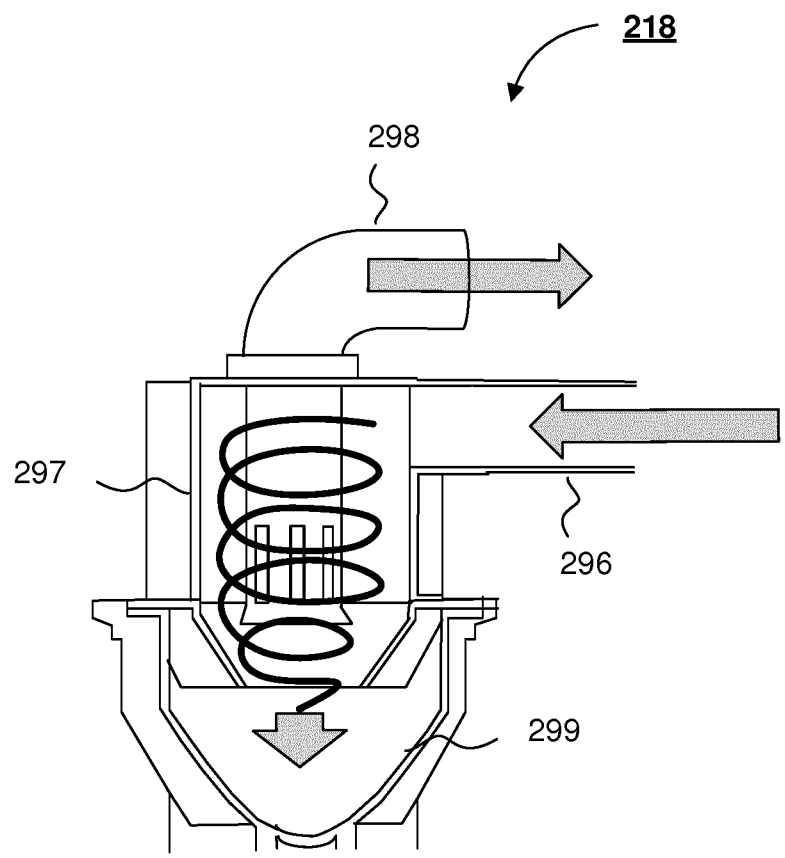
FIG. 2C schematically illustrates a build material trap geometry used in tanks of the material management station internal circuit of FIG. 2A.

Each of the recovered build material tank 208, the overflow tank 210, and the mixing tank 212 has a build material trap 218b, 218a and 218c respectively. These build material traps 218a, 218b, 218c perform cyclonic filtration of an incoming fluidised flow of build material and air as schematically illustrated in FIG. 2C. An inlet 296 of the build material trap 218 receives the fluidised flow of build material and the build material is pushed by a centrifugal force created by suction of the pump 204 to an outer wall 297 of the build material trap 218. In one example, the outer wall 297 of the build material trap 218 has a circular cross-section and the incoming build material migrates via a cyclonic action to the outer wall 297 of the build material trap 218 until the incoming air reaches an exit below, whereupon the build material particles drop down into a vacuum sealed recipient 299 in the build material trap 218. Thus the build material trap 218 separates a fluidised flow of build material into a powder component, which is deposited in the associated tank and an air component, which is sucked towards the pump 204 via an air outlet 298 in the build material trap 218 providing an interface to the pump 204. A filter (not shown) may be provided in the air outlet 298 of the build material trap 218 to reduce the likelihood of any remaining build material reaching the pump 204 in the separated air flow. The build material trap 218 provides efficient powder separation via its geometry that promotes formation of a cyclone within the build material trap in use. It offers transportation of build material in an air flow and storage of the powder in a tank, whilst diverting an air flow out of the tank towards the pump 204. The build material trap provides a filter to capture residual powder in an air flow emerging from the cyclone to limit it from reaching the pump 204. The build material trap 218 is one example of a build material filter having a function of separating an air from a build material flow at a corresponding tank inlet area. In other examples, the air flow is separated from the fluidised build material upon arrival at a destination tank using a filter other than a cyclonic filter. For example, a diffusion filter may be used.

Returning to FIG. 2A, the RBMT inlet area of the recovered build material tank 208 may also include the RBMT build material trap 218b (e.g. a powder trap) or another type of RBMT build material filter to separate build material and air from an incoming fluidised flow of build material. The RBMT build material trap 218b operates in the same or a similar way as the overflow build material trap 218a in the overflow tank 210, to help collect and divert build material into the recovered build material tank 208 to help limit build material from traveling through the third conduit 276 towards the pump 204.

When collecting material from the trolley 102 via the collection hose 206, as described above, a user can move the end of the collection hose 206 around the working area 203 including the trolley 102 to collect as much build material from the trolley 102 as possible.

The recovered build material tank 208 is also connected via a fifth conduit (overflow-to-RBMT conduit) 280 of the conduit network. An overflow tank port in the form of an overflow tank inlet port 281 may also be provided at an end of the fifth conduit 280. Build material from the overflow tank 210 can be transported through the fifth conduit 280 and overflow tank inlet port 281 into the recovered build material tank 208.

The fifth conduit 280 between the recovered material tank 208 and the overflow tank inlet port 281 includes an overflow-to-RBMT valve 250 in the path leading to the RBMT build material trap. In the event that the recovered build material tank 208 needs to be refilled with recovered build material, the overflow-to-RBMT valve 250 in the fifth conduit 280 between the recovered build material tank 208 and the overflow tank 210 can be opened, along with the RBMT-to-pump valve 246 in the third conduit 276 between the recovered build material tank 208 and the pump 204. Each of the valves can be opened electronically by the controller 295, as described above. When the pump is active, a differential pressure is provided from the pump to the overflow tank 210. That is, a pressure at the pump 204 is lower than a pressure at the overflow tank 210. In this example, the overflow tank 210 is provided in an unsealed configuration and includes an air inlet (not shown) open to atmosphere to maintain approximately atmospheric pressure within the overflow tank 210. The differential pressure enables build material from the overflow tank 210 to be transported to the recovered build material tank 208. Air flows into the overflow tank 210 through the air inlet. Build material (and air) in the overflow tank is transported from the overflow tank 210, along the fifth conduit 280 and through the overflow-to-RBMT valve 250 to the recovered build material tank 208. At the recovered build material tank 208, build material separates from air flow and drops from the RBMT inlet area into the recovered build material tank 208. Air (and any residual build material) continues along the third conduit 276 and through the RBMT-to-pump valve 246 towards the pump 204, which is at a reduced pressure.

The material management station circuit 200 also includes a mixing tank 212. The mixing tank 212 can be used to mix recovered build material from the recovered build material tank 208 with fresh build material from a fresh build material supply tank 214a or 214b, ready to be used in a 3D printing process.

Although two fresh build material supply tanks 214a, 214b are shown in this example, in other examples, one or more fresh build material supply tanks 214a, 214b may be used. More fresh build material supply tanks 214a, 214b may be used when appropriate.

Each fresh build material supply tank 214a, 214b is connected to the mixing tank 212 via a sixth conduit (a fresh build material conduit) 282 of the conduit network and a fresh build material supply tank port 283a, 283b. The fresh build material supply tank port 283a, 283b is to output build material from the respective fresh build material supply tank 214a, 214b. Each fresh build material supply tank 214a, 214b has an associated material supply tank cartridge-to-mixer valve 252a, 252b in the sixth conduit 282 between the respective fresh build material supply tank 214a, 214b and the mixing tank 212. Each fresh build material supply tank 214a, 214b also includes an air inlet valve whereby to ensure air can enter the fresh build material supply tanks 214a, 214b to maintain air pressure within the fresh build material supply tanks 214a, 214b at approximately atmospheric pressure.

The mixing tank 212 is connected via a seventh conduit (pump-to-mixer conduit) 284 of the conduit network to the pump 204. The seventh conduit 284 between the mixing tank 212 and the pump 204 includes a mixer-to-pump valve 254, which may be opened or closed to open and close the passage through the seventh conduit 284.

To transport fresh build material from the fresh build material supply tank 214a or 214b to the mixing tank 212, the material supply tank cartridge-to-mixer valve 252a or 252b and the mixer-to-pump valve 254 in the seventh conduit 284 between the mixing tank 212 and the pump 204 are opened. Each of the valves can be opened electronically by the controller 295, as described above. When the pump 204 is active, a differential pressure is provided from the pump 204 to the fresh build material supply tank 214a or 214b. That is, a pressure at the pump 204 is lower than a pressure at the fresh build material supply tank 214a or 214b. The differential pressure enables build material from the fresh build material supply tank 214a or 214b to be transported to the mixing tank 212. Build material (and air) in the fresh build material supply tank 214a or 214b is transported from the fresh build material supply tank 214a or 214b, along the sixth conduit 282 and through the cartridge-to-mixer valve 252a or 252b to the mixing tank 212. At the mixing tank 212, build material separates from air flow and drops from the mixer inlet area into the mixing tank 212. Air (and any residual build material) continues along the seventh conduit 284 and through the mixer-to-pump valve 254 towards the pump 204, which is at a reduced pressure.

The mixer inlet area of the mixing tank 212 can also include a mixer build material trap 218c (e.g. a powder trap) or any type of mixer build material filter to separate an air flow from a build material flow, which operates in the same or similar manner to as the overflow build material trap 218a and the RBMT build material trap 218b. The mixer build material trap 218c helps to collect and divert build material into the mixing tank 212, and help limit the build material from travelling through the seventh conduit 284 towards the pump 204.

The mixing tank 212 is also connected to the recovered build material tank 208 via an eighth conduit (RBMT-to-mixer conduit) 286 of the conduit network and a ninth conduit 288 of the conduit network extending sequentially from the recovered build material tank 208 to the mixing tank 212. The ninth conduit 288 may be part of the RBMT-to-mixer conduit 286.

A sieve 216 may, in some examples, be located in the RBMT to mixer conduit 286 or between the eighth and ninth conduits 286 and 288 between the recovered build material tank 208 and the mixing tank 212. The sieve 216 may be used to separate agglomerates and larger parts of material from the recycled or recovered build material that is transported from the recovered build material tank 208. Often, agglomerates and larger parts of material are not suitable for recycling in a further 3D printing process, so the sieve may be used to remove these parts from the build material. The sieve 216 includes an air inlet (not shown) to ensure air can enter the sieve 216 to maintain air pressure within the sieve 216 at approximately atmospheric pressure. In some examples, the RBMT-to-mixer conduit 286 may not be connected to a build material outlet of the recovered build material tank 208. In other examples a conduit connecting an outlet of the recovered build material tank 208 to a build material inlet in the mixer build material trap 218c of the mixing tank 212 may form a closed circuit.

A RBMT-to-sieve valve 256 is located in the eighth conduit 286 between the recovered build material tank 208 and the sieve 216, and a sieve-to-mixer valve 258 is located in the ninth conduit 288 between the sieve 216 and the mixing tank 212. The RBMT-to-sieve valve 256 and sieve-to-mixer valve 258 may be opened or closed to open and close the passages through the eighth and ninth conduits 286, 288 between the recovered build material tank 208 and the mixing tank 212. The valves may be opened or closed electronically by the controller 295.

To transport build material from the recovered build material tank 208 to the mixing tank 212 both the RBMT-to-sieve valve 256 and the sieve-to-mixer valve 258 in the eighth and ninth conduits 286, 288 between the recovered build material tank 208 and the mixing tank 212 can be opened as well as the mixer-to-pump valve 254 in the seventh conduit 284 that connects the mixing tank 212 to the pump 204. Build material in the recovered build material tank 208 may drop down into the sieve 216 through the eighth conduit 286 by gravity, for example. When the pump 204 is active, a differential pressure is provided from the pump 204 to the sieve 216. That is, a pressure at the pump 204 is lower than a pressure at the sieve 216. The differential pressure enables build material from the recovered build material tank 208 to be transported to the sieve 216 by gravity and to the mixing tank 212 by suction. Build material in the recovered build material tank 208 is transported through the RBMT material outlet, along the eighth conduit 286 and through the RBMT-to-sieve valve 256 to the sieve 216. Build material (and air) in the sieve 216 is transported from the sieve 216, along the ninth conduit 288 and through the sieve-to-mixer valve 258 to the mixing tank 212. At the mixing tank 212, build material separates from air flow and drops from the mixer inlet area into the mixing tank 212. Air (and any residual build material) continues along the seventh conduit 284 and through the mixer-to-pump valve 254 towards the pump 204, which is at a reduced (negative) pressure.

A currently selected ratio of recycled build material from the recovered build material tank 208 and fresh build material from the fresh build material supply tank 214a or 214b can be transported to the mixing tank 212 as described above. The ratio of fresh build material to recovered build material may be any selected ratio. The ratio may depend on the type of build material and/or the type of additive manufacturing process. In a selective laser sintering process the ratio could be, for example 50% fresh to 50% recovered build material. In one example of a printhead cartridge 3D printing process, the ratio may be 80% recovered to 20% fresh build material. For some build materials 100% fresh build material may be used, but for other build materials up to 100% recovered build material may be used. The fresh build material and the recovered build material can be mixed together within the mixing tank 212 using, for example, a rotating mixing blade 213.

Once the fresh build material and the recovered build material are sufficiently mixed, the mixed build material can be transported from the mixing tank 212 through a mixer-to-trolley valve 260, a tenth conduit (mixer-to-trolley conduit) 290 of the conduit network, a working area port in the form of a working area outlet port 291, to the working area 203 and into the trolley 102. Build material from the mixing tank 212 can pass through the working area outlet port 291 into the working area 203. The trolley 102 (or container) can be located substantially beneath the mixing tank 212 so that gravity can aid the transport of mixed build material from the mixing tank 212, through the mixer-to-trolley valve 260, the tenth conduit 290, the working area outlet port 291 and the working area 203 to the trolley 102.

Once the trolley 102 is filled with enough build material for a given 3D print run, the trolley 102 can be returned to the 3D printer 104. An appropriate quantity of build material to fill the trolley 102 for a print job may be controlled by the controller 295 of the material management station 106 based on the material management station 106 sensing how much build material is in the trolley when the trolley is docked in the material management station 106 at the beginning of a trolley fill workflow. The controller may then fill the trolley with a particular quantity (dose) of build material requested by a user for a particular print job intended by the user. The dosing is achieved by using a fill level sensor (not shown) such as a load cell in the mixing tank 212 to output a fill level value indicative of an amount of non-fused build material in the mixing tank. The fill level sensor can be one or more load cells, or any other type of sensor such as a laser-based sensor, a microwave sensor, a radar, a sonar, a capacitive sensor, etc. When the fill level sensor is a load cell, the fill level value can be an electrical signal indicative of a mass of the non-fused build material in the storage container.

A number of different workflows may be implemented in the material management station 106. These workflows are managed by the user, but some level of automation may be provided by a data processor on the material management station 106. For example, the user may select a workflow from a digital display on the material management station 106. For users having one material management station 106 and one printer 104 an example workflow cycle may be filling the trolley 102, followed by printing a 3D object, followed by unpacking the object from a build volume in the material management station 106 followed by a subsequent print operation and a corresponding unpacking of the build volume and so on. However, the material management station 106 may serve two or more printers so that successive unpacking and trolley filling operations may be performed by the material management station 106. The user may also choose to perform the trolley filling, printing and unpacking functions in a random order.

For each of the workflow operations, a user interface of the material management station 106 may guide the user to undertake particular manual operations that may be performed as part of the workflow operation. For example, to perform an unpack operation, the user interface may instruct the user to move the collection hose 206 around the collection area 203 as described previously. In addition, the material management station 106 can automatically initiate other functions of the workflow operation. For example, to perform the unpack operation, the material management station 106 can automatically operate the pump 204 whilst the user moves the collection hose 206 around the collection area 203 to recover build material from the trolley 102. Any workflow operations the material management station 106 can perform fully automatically may be signaled to the user through the user interface without requiring user confirmation to proceed. If the workflow operation could present a potential safety risk, the otherwise fully automatic workflow operation may require user confirmation to proceed.

For example, to load the trolley 102 with build material, the user sets this workflow operation then the material management station 106 automatically launches the different operations required sequentially. The material management station 106 is controlled to send build material from the recovered build material tank 208 to the mixing tank 212. The material management station 106 is further controlled to send fresh build material from at least one of the fresh build material supply tanks 214a, 214b to the mixing tank 212. The material management station 106 is subsequently controlled to blend the mixture in the mixing tank 212. The mixed build material in the mixing tank 212 can then be discharged to the trolley 102. In an example, this workflow operation is completed as a batch process, and so the cycle may be continuously repeated to completely fill the trolley 102.

In some processes, a small portion (e.g. 1%) of build material can pass through the build material traps 218a, 218b, 218c (e.g. the powder traps) and can travel towards the pump 204.

An additional RBMT build material trap 220 (e.g. a powder trap) may, in some examples, be located in an eleventh conduit (pump feed conduit) 292 of the conduit network that connects each of the third, fourth and seventh conduits 276, 278 and 284 to the pump 204. The additional RBMT build material trap 220 is connected to the RBMT inlet area. The additional RBMT build material trap 220 collects build material that may have passed through any of the overflow build material trap 218a, RBMT build material trap 218b or mixer build material trap 218c to help limit it from reaching the pump 204. Build material collected in the additional RBMT build material trap 220 can be transported into the recovered build material tank 208 by opening a trap-to-RBMT valve 262. The trap-to-RBMT valve 262 may be opened electronically by the controller 295. The RBMT build material trap 220 may operate in the same or similar way to each of the overflow, RBMT, and mixer build material traps 218a, 218b and 218c. Build material can be transported from the RBMT build material trap 220 to the recovered build material tank 208 by gravity.

A pump filter 222 may also be located in a twelfth conduit 294 of the conduit network adjacent the pump 204. This pump filter 222 helps to collect any build material that may have passed through any of the overflow build material trap 218a, RBMT build material trap 218b or mixer build material trap 218c as well as the additional RBMT build material trap 220. This helps limit the build material from reaching the pump 204, thereby reducing the likelihood of the function of the pump 204 being impaired, which could happen if large quantities of build material were to reach it.

At any time, when the material management station 106 is to be used to process build material of a different material type, for example of a different material, the material management station circuit 200 can be controlled to implement a purging process to purge substantially all build material of a current material type from the material management station circuit 200 to the overflow tank 210. The fresh build material supply tanks 214a, 214b can be disconnected from the build material station circuit 200 and stored to limit wastage of fresh building material of the current material type.

In one example, the purging process is carried out when unfused build material in the trolley 102 has already been collected using the collection hose 206 and transported either to the recovered build material tank 208 or to the overflow tank 210, or both. Alternatively, the purge process can include using the collection hose 206 to transport any unfused build material in the trolley 102 to the overflow tank 210, as described previously.

The purge process includes transporting any unfused build material in the recovered build material tank 208 to the overflow tank 210. To transport unfused build material from the recovered build material tank 208 to the overflow tank 210, the RBMT-to-sieve valve 256 and the sieve-to-mixer valve 258 in the eighth and ninth conduits 286, 288 between the recovered build material tank 208 and the mixing tank 212 can be opened as well as the mixer-to-trolley valve 260 in the tenth conduit 290 and the hose-to-overflow valve 244 in the second conduit 274 between the collection hose 206 and the overflow tank 210 and the overflow-to-pump valve 248 in the fourth conduit 278 between the pump 204 and the overflow tank 210. Any build material in the recovered build material tank 208 drops down into the sieve 216 through the eighth conduit 286 by gravity. The collection hose 206 can be connected directly to the tenth conduit 290 before or after any cleaning of the unfused build material in the trolley 102 has been completed. When the pump 204 is active, a differential pressure is provided from the pump 204 to the sieve 216 via the overflow-to-pump valve 248, the overflow tank 210, the hose-to-overflow valve 244, the collection hose 206, the mixer-to-trolley valve 260, the mixing tank 212 and the sieve-to-mixer valve 258. Build material in the recovered material tank 208 is transported to the sieve 216 by gravity via the eighth conduit 286 and the RBMT-to-sieve valve 256. That is, a pressure at the pump 204 is lower than a pressure at the sieve 216. The differential pressure enables build material from the recovered build material tank 208 to be transported to the sieve 216 and on to the overflow tank 210. At the overflow tank, build material separates from air flow and drops from the overflow inlet area into the overflow tank 210. Air (and any residual build material) continues along the fourth conduit 278 and through the overflow-to-pump valve 248 towards the pump 204, which is at a reduced pressure. It can be seen that any unfused build material in the sieve 216, the mixing tank 212 or in any of the eighth conduit 286, the ninth conduit 288, the tenth conduit 290 or the second conduit 274 may also be transported to the overflow tank 210. In this way, substantially all unfused build material in the material management station circuit 200 can be transported to the overflow tank 210.

Alternatively, the unfused build material in the recovered build material tank 208 can be transported to the trolley 102 as described previously. Subsequently, the unfused build material in the trolley 102 can be transported to the overflow tank 210, also as described previously. Thus, an alternative way to transport unfused build material from the recovered build material tank 208 to the overflow tank 210 can be provided without directly connecting the collection hose 206 to the tenth conduit 290.

The purge process can also include one or more further purging process elements where a sacrificial material is transported through any part of the conduit network of the material management station circuit 200 which may still contain at least an amount of unfused build material of a current material type. The sacrificial material can act to dislodge at least some of the current build material remaining in the material management station circuit 200. The sacrificial material in one example may be the build material of the different build material type to be subsequently used in the material management station 106. The sacrificial material may alternatively be an inert material (e.g., silica) which is not a build material. In this way, any small amount of sacrificial material remaining in the material management station 106 at the end of the purging process is unlikely to interfere with the further operation of the material management station 106.

After the purge process is completed, and substantially all the unfused build material in the material management station circuit 200 is in the overflow tank 210, the overflow tank 210 can then be removed from the material management station 106, for example for storage or disposal and a further overflow tank (not shown) can be connected to the material management station 106. The further overflow tank can be empty or the further overflow tank can contain build material previously purged from the (or another) material management station 106.

The purge process can be performed in response to a user input, or automatically. Where purging is performed automatically, the material management station circuit 200 can be controlled to implement the purging process when a trolley 102 containing a different material is slotted into the docking position 107 in the material management station 106. In this example, a material type is electronically recorded on a memory chip of the trolley 102 (or other container). The memory chip is readable by the processing circuitry of the material management station 106 to determine the material type of the material in the trolley 102 (or other container). Alternatively or additionally, the material management station circuit 200 can be controlled to implement the purging process when one or more fresh build material supply tanks 214a, 214b containing a different material type are connected to the material management station circuit 200. In this example, a material type is electronically recorded on a memory chip of the fresh build material supply tanks 214a, 214b. The memory chip is readable by the processing circuitry of the material management station 106 to determine the material type of the material in the fresh build material supply tanks 214a, 214b. In other examples, the material management station circuit 200 can be controlled to implement the purging process when both fresh build material supply tanks 214a, 214b are removed from the material management station circuit 200. It will be appreciated that the material management station 106 may be controlled to provide an indication to a user that the purging process can be performed based on the criteria discussed previously.

Figure 3A:
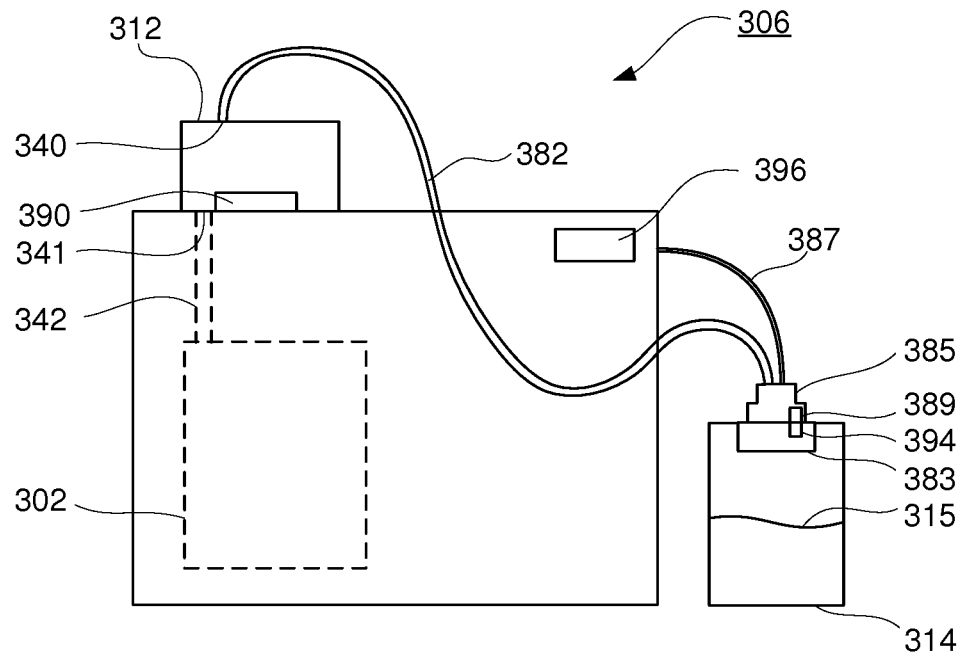
FIG. 3A schematically illustrates a material management station of the example of FIG. 1B that is mechanically coupled to a fresh build material supply tank.

FIG. 3A shows an example of an additive manufacturing material management station 306. The material management station 306 may include any of the features described above in relation to FIG. 2, and may operate in a similar manner to transport particulate build material (e.g. powdered build material) between different components.

In this example, the material management station 306 includes a collection tank 312 for receiving fresh and/or recyclable build material within the main body of the material management station. The collection tank 312 includes an inlet 340 for receiving fresh build material 315 from a fresh build material supply tank 314. The collection tank 312 may also include an outlet 341 for transferring build material out of the collection tank 312 into a container 302. The container 302 may be a trolley as described in relation to FIGS. 1A, 1B and 2. Alternatively, the container 302 may be a separate box or tank for holding build material. An outlet conduit 342 may be connected between the outlet 341 and the container 302, to help transport build material from the collection tank 312 to the container 302.

A supply conduit 382 may connect between the inlet 340 to the collection tank 312 and the fresh build material supply tank 314. The supply conduit 382 may be provided with a tank connector 385 for detachably connecting to the fresh build material tank port 383 of the fresh build material supply tank 314. The supply conduit 382 may detachably connect to the inlet 340 to the collection tank 312. The further end of the conduit 382 (e.g. the tank connector 385) may be disconnected from the fresh build material supply tank 314 so that the fresh build material supply tank 314 can be replaced. For example, when it is empty, an empty fresh build material supply tank 314 may be replaced with a full fresh build material supply tank 314. In another example, the fresh build material supply tank 314 may be replaced with a different fresh build material supply tank 314 containing a different fresh build material 315.

The fresh build material supply tank 314 is provided with a data memory chip 394, and read-write electrical communication (two-way electrical communication) may be established between the material management station 306 and data memory chip of the fresh build material supply tank 314, when the fresh build material supply tank is mechanically connected to the supply conduit 382. The electrical communication between the material management station 306 and data memory chip 394 on the fresh build material supply tank 314 and the data recorded onto the data memory chip may be encrypted. The data memory chip of the fresh build material supply tank 314 may be a secure memory chip.

In the illustrated example, the material management station 306 is provided with a data communication cable 387 that is releasably connectable to the fresh material supply tank 314 for direct electrical communication between the main body of the material management station and the fresh material supply tank. In the present example, the data communication cable 387 terminates at the tank connector 385, additionally providing electrical communication between the material management station 306 and the fresh build material supply tank 314 when the tank connector 385 is mechanically connected to the fresh build material tank port 383 of the fresh build material supply tank 314. Alternatively, the material management station may be provided with a data communication cable with a respective electrical connector that is releasably connectable to the fresh material supply tank separately from the supply conduit and tank connector.

Figure 3B:
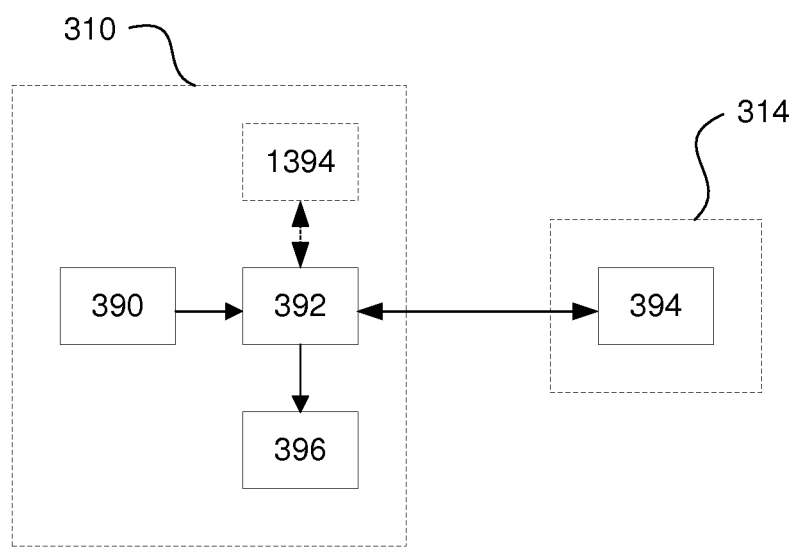
FIG. 3B schematically illustrates a data processing system in the material management station in electrical communication with a fresh build material supply tank, in correspondence with the example of FIG. 3A.
Figure 3C:
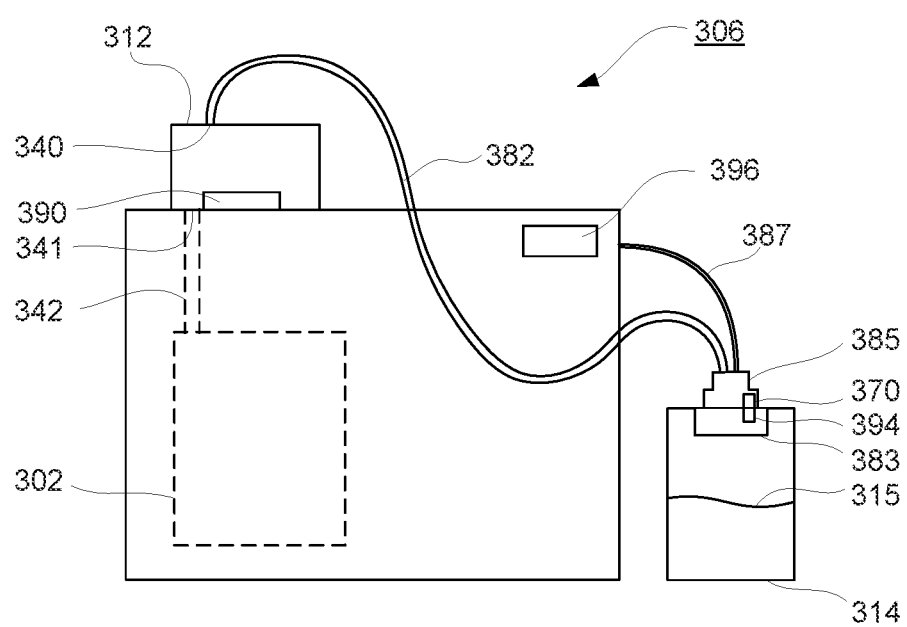
FIG. 3C schematically illustrates a material management station of the example of FIG. 1B that is mechanically coupled to a fresh build material supply tank.

Alternatively, read-write communication between the material management station 306 and the fresh build material supply tank 314 may be provided, for example, by providing a two-way radio frequency (RF) connection between the material management station 306 and the data memory chip 394 of the fresh build material supply tank 314, e.g., via RF transducer 370 shown in FIG. 3C. The use of an RF connection may simplify the mechanical connection between the material management station 306 and the fresh build material supply tank 314.

In the illustrated example, the tank connector 385 has a chip reader 389 to connect electrically to the data memory chip 394 on the fresh material supply tank 314 by contacting electrode pads 593 (shown in FIG. 5) in the fresh build material supply tank port 383 with resiliently deformable electrodes 595 (shown in FIG. 5) (e.g. sprung-electrodes) in the tank connector 385. The electrode pads 593 are electrically connected to the data memory chip 394 of the fresh material supply tank 314. The data communication cable 387 communicates data between the chip reader 389 and a data processor 392 of the material management station 306.

When the tank connector 385 of the supply conduit 382 is mechanically connected to the fresh build material supply tank 314, the material management station 306 may read data that has previously been written onto the data memory chip 394 of the material supply tank. For example, the previously written data may record a tank identifier for the fresh build material supply tank 314, may record the type of fresh build material 315 within the fresh build material supply tank, and may record the initial quantity of fresh build material 315 contained in the fresh build material supply tank prior to first post-manufacturing use and/or the recorded residual quantity of fresh build material 315 remaining within the fresh build material supply tank after prior use. Additionally, the material management station 306 may write data to the data memory chip 394 of the fresh build material supply tank 314. For example, data may be written to the data memory chip 394 to update the record of the recorded residual quantity of fresh build material 315 therein, as (or after) fresh build material is drawn out up the supply conduit 382.

Some of the data recorded on the data memory chip 394 may be read-only data (e.g. the type of fresh build material 315), and some of the recorded data may be over-writable by the material management station 306 (e.g. a quantity of fresh build material 315). The data memory chip 394 may be secured and/or encrypted, to prevent or hinder reading from and/or writing to the data memory chip, except by a compatible material management station 306 (e.g. with communication being established after a hand-shaking protocol has been successfully completed). Additionally, the data memory chip 394 may be protected by a restriction that limits the recorded data corresponding to a residual quantity of fresh build material to counting monotonically, corresponding with a decreasing recorded residual quantity (e.g. a one-way counter).

A data processor 392 of the material management station 306 may read the tank identifier recorded on the data memory chip 394 of the fresh build material supply tank 314, and use the tank identifier to identify the type of fresh build material 315 contained in the fresh build material supply tank (e.g. by consulting a look-up table of the data processor). If the type of fresh build material 315 identified by reading the tank identifier is incompatible with the 3D printer 104 of the 3D printing system 100, the data processor prevents fresh build material 315 from being drawn into the material management station 306, e.g. preventing the fresh build material from being drawn into the supply conduit 382, to protect the 3D printer from damage arising through the use of incompatible build material.

The withdrawal of fresh build material 315 from the fresh build material supply tank 314 may be prevented by closing the material supply tank cartridge-to-mixer valve 252a or 252b (associated with the respective material supply tank 214a or 214b, 314) and the mixer-to-pump valve 254 in the seventh conduit 284 between the mixing tank 212 and the pump 204, thereby preventing the coupling of the material supply tank 214a, 214b, 314 to negative pressure (reduced pressure) from the pump 204. Alternatively, or additionally, the withdrawal of fresh build material 315 from the fresh build material supply tank 214a, 214b, 314 may be prevented by closing a valve 252a, 252b of the supply conduit 282, 382 thereby preventing the coupling of the material supply tank 214a, 214b, 314 to negative pressure from the pump 204.

If the data processor 392 is unable to read a tank identifier from the fresh build material supply tank 314, the data processor may prevent fresh build material 315 from being drawn into the material management station 306 from the fresh build material supply tank, which may protect the 3D printer from damage arising through the use of incompatible build material.

If the data processor 392 detects that the recorded residual quantity of fresh building material 315 in the fresh build material supply tank 314 is at or below a threshold level (e.g. zero), the data processor prevents fresh build material 315 from being drawn into the material management station 306 from the fresh build material supply tank. For example, the material management station 306 may fully extract the contents of a build material supply tank 314, and write data (e.g. a status flag) to the data memory chip 394 to indicate that the supply tank should no longer be used. Accordingly, in the event that the fresh build material supply tank 314 has been re-filled subsequent to manufacture, the data processor 392 may prevent the withdrawal of further build material, in excess of the initial quantity of fresh build material with which the manufacturer filled the fresh build material supply tank 314 (i.e. prior to first use).

Preventing the withdrawal of excess fresh build material from the fresh build material supply tank 314 protects the 3D printer from the risk of damage arising through the on-going use of incompatible build material, and provides a deterrent against contaminating compatible fresh build material with fresh build material that is not authorised by the manufacturer of the fresh build material supply tank. The operating parameters of the 3D printer may be carefully tuned to the properties of the authorised build material, and the use of an alternative build material could result in poor quality 3D printing, a failure successfully to print, damage to the printhead of the 3D printer (e.g. due to splash-back onto the printhead of excessively fine powder), or thermal run-away problems (e.g. uncontrolled melting). Such occurrences risk damaging the 3D printer, as well as impair the quality of printed objects.

Additionally, recording the determined residual quantity of fresh build material 315 in the fresh build material supply tank 314 on the data memory chip 394 of the fresh build material supply tank 314 enables other material management stations 306 to detect the risk presented by a fresh build material supply tank that has been re-filled and to prevent the withdrawal of further build material, in excess of the initial quantity of fresh build material with which the manufacturer filled the fresh build material supply tank.

Alternatively, or additionally, the determined residual quantity of fresh build material 315 may be recorded locally by the material management station 306 and/or by a central database on which the recorded data is correlated with a unique identifier for the build material supply tank 314.

The collection tank 312 includes a quantity sensor for measuring a total quantity of build material within the collection tank 312. In the illustrated example, the quantity sensor is a weight sensor 390. The weight sensor 390 may include a load cell placed within the collection tank 312. Alternatively, a weight sensor may be provided that weighs the fresh build material supply tank, e.g. with a weight sensor in a bay of the material management station 306, upon which the supply tank sits, in use. In a further alternative, the quantity sensor may be a volume sensor.

The weight sensor 390 may form part of a data processing system 310, as shown in FIG. 3B. In this example, the data processing system 310 comprises the weight sensor 390, a data processor 392, a supplementary data memory chip 1394 (not required in all embodiments) in the material management station 306, and an output display 396 (not required in all embodiments). The data processor 392 may be comprised within the controller 295 of FIG. 2A.

The weight sensor 390 is configured to transmit weight data to a data processor 392, which may be connected to the weight sensor via suitable circuitry, for example. The data processor 392 receives weight data from the weight sensor 390 to allow the data processor 392 to determine the weight of fresh build material 315 drawn out of the fresh build material supply tank 314. By knowing the quantity of fresh build material 315 in in the fresh build material supply tank 314, e.g. by reading the recorded initial quantity or recorded residual quantity of fresh build material 315 in the fresh build material supply tank 314 from the data memory chip 394, this allows the data processor 392 to compute an updated residual value of the weight of fresh build material 315 remaining in the fresh build material supply tank 314. The data processor 392 may then write the updated residual value to the data memory chip 394 of the fresh build material supply tank 314. Further, if the data processor 392 detects that the computed updated residual quantity of fresh building material 315 in the fresh build material supply tank 314 is at or below a threshold level (e.g. zero), the data processor prevents fresh build material 315 from being drawn into the material management station 306 from the fresh build material supply tank.

For example, a portion of fresh build material 315 may be transferred to the collection tank 312 via the conduit 382 from an initially full fresh build material supply tank 314. The weight sensor 390 in the collection tank 312 (or alternatively, a weight sensor beneath the fresh build material supply tank 314) may measure the weight of fresh build material 315 withdrawn from the fresh build material supply tank and added to the collection tank. The data processor 392 can receive weight data from the weight sensor 390 corresponding to the weight of fresh build material 315 added to the collection tank 312 and can subtract the weight of fresh build material 315 added to the collection tank 312 from the recorded initial weight of build material 315 within the build material supply tank 314. Thus, the data processor 392 can calculate a remaining weight of fresh build material 315 within the build material supply tank 314, which may then be updated onto the data memory chip 394.

The initial weight of fresh build material 315 in the fresh build material supply tank 314 can be controlled or measured during manufacture of the fresh build material supply tank 314. Thus, the initial weight of fresh build material 315 in a fresh build material supply tank 314 may be stored on the data memory chip 394 of the fresh build material supply tank 314 prior to the first post-manufacturing use. Alternatively, if the initial weight of fresh build material 315 in the build material supply tank 314 is not already known, the initial weight of build material can be measured, for example using weight sensors (not shown) prior to connecting the fresh build material supply tank 314 to the conduit 382 of the material management station 306.

The supplementary data memory chip 1394 (not required in all embodiments) may be included in the data processing system 390 and may be integral with the material management station 306. The secondary data memory chip 1394 can store the weight of fresh build material 315 remaining in the build material supply tank 314 and the weight of build material in the collection tank 312. The data processor 392 can write and/or update the calculated remaining weight of fresh build material 315 within the build material supply tank 314 to the data memory chips 394 and 1394. Alternatively or additionally, the data processor 392 may write and/or update the total weight of fresh build material 315 removed from the fresh build material supply tank 314 to the data memory chips 394 and 1394. The supplementary data memory chip 1394 may record data relating to the build material supply tank 314 and the withdrawal of fresh build material from the build material supply tank. The data recordal may occur after the withdrawal of fresh build material 315 has been completed, or may occur during the withdrawal of fresh build material, e.g. as a real-time update.

Further portions of fresh build material may be transferred to the collection tank 312 from the fresh build material supply tank 314. Further portions of fresh build material 315 may be added to an empty or substantially empty collection tank 312 or may be added to the collection tank 312 in addition to build material already within the collection tank 312.

The data processor 392 can obtain further weight data from the weight sensor 390 corresponding to a weight of a further portion of fresh build material within the collection tank 312 and can process the further weight data to calculate a total weight of fresh build material remaining in the build material supply tank 314.

For example, if the further portion of fresh build material is added to an empty or substantially empty collection tank 312, the weight sensor can measure the total weight of build material within the collection tank. The data processor may receive the weight data from the weight sensor 390 and can use the weight data to calculate a remaining weight of build material 315 within the fresh build material supply tank 314.

To calculate a residual weight of fresh build material 315 in the fresh build material supply tank 314, that was provided by the tank manufacturer, the data processor may obtain data corresponding to the total weight of fresh build material previously transferred to the collection tank 312 from the data memory chip 394. The data processor 392 may then add the weight of build material previously transferred to the weight of the further portion of build material within the collection tank 312 (as measured by the weight sensor 390), to thereby calculate a total weight of fresh build material that has transferred from the build material supply tank 314 to the collection tank 312. The data processor 392 may then write this updated residual weight data to the data memory chip 394 for use in further calculations.

The data processor 392 may subtract the total weight of fresh build material that has transferred from the fresh build material supply tank 314 from the initial weight of fresh build material 315 in the build material supply tank 314 to thereby calculate a remaining weight of fresh build material 315 in the fresh build material supply tank 314.

In another example, the data processor 392 may obtain data corresponding to the weight of fresh build material 315 remaining in the fresh build material supply tank 314 from the data memory chip 394. This data may have been written to the data memory chip 394 by the data processor 392 after a previous calculation. The data processor 392 may then subtract the weight of the further portion of fresh build material transferred to the collection tank 312 (as measured by the weight sensor 390), and subtract this weight data from the remaining weight of fresh build material 315 previously recorded in the fresh build material supply tank 314, to calculate a new remaining weight of fresh build material 315 in the fresh build material supply tank 314.

The material management station 306 may include an output display 396 (not required in all embodiments), for example an LED screen, which may display the residual weight of fresh build material 315 determined to be in the fresh build material supply tank 314 and/or the total weight of build material within the collection tank 312. The output display 396 may form part of the data processing system 310 as shown in FIG. 3B. The data processor 392 may be connected to the output display 396 to transmit weight data to the output display 396.

As described above in relation to FIG. 2, the collection tank 312 may also receive recyclable build material from a recyclable build material tank included in the material management system. For brevity, the recyclable build material tank will not be discussed again in detail.

The recyclable build material may be received by the collection tank 312 through a further inlet (not shown). As described above in relation to FIG. 2, a conduit may be connected between the collection tank 312 and the recyclable material tank for transporting recyclable build material from the recyclable material tank to the collection tank 312. The conduit can connect at one end to the further inlet of the collection tank 312.

The fresh build material supply tank 314 may be disconnected and replaced with a different fresh build material supply tank at any time. For example, the fresh build material supply tank 314 may be replaced when the data processor 392 calculates there is no fresh build material 315 remaining in the fresh build material supply tank 314. When the fresh build material supply tank 314 is replaced (e.g. with a full fresh build material supply tank), the data processor may read data from the corresponding data memory chip 394 of the fresh build material supply tank to obtain the quantity of fresh build material 315 recorded to be contained therein (which may differ from the actual quantity of fresh build material contained in the tank, if the tank has been subject to an unauthorised re-fill).

As described above in relation to FIG. 2, the collection tank 312 can include a mixer to mix recyclable and fresh build material together in the collection tank 312. Mixed build materials can exit the collection tank through the outlet 341, into the container 302 (e.g. a trolley).

Fresh build material and recyclable build material can each be transferred to the collection tank 312 as described above (e.g. fresh build material and recyclable build material may be transferred and weighed separately), and the quantities of each that are transferred can be measured. Thus, a user can accurately measure a ratio of fresh build material and recyclable build material within the collection tank 312.

Some material management systems may include two or more fresh build material supply tanks 314 as described above in relation to FIG. 2. In this case, the data processor 392 may switch the source of fresh build material to a second fresh build material supply tank when it calculates that a first fresh build material supply tank is empty. This allows continuous transfer of fresh build material to the mixing tank whilst the first fresh build material supply tank is replaced. The data processor 392 can measure the remaining weight of fresh build material in the second fresh build material supply tank in the same way as described above.

Having the weight sensor 390 within the collection tank 312 eliminates the need to have a separate weight sensor at every fresh build material supply tank 314. Thus costs of producing the fresh build material supply tanks can be reduced.

Figure 4:
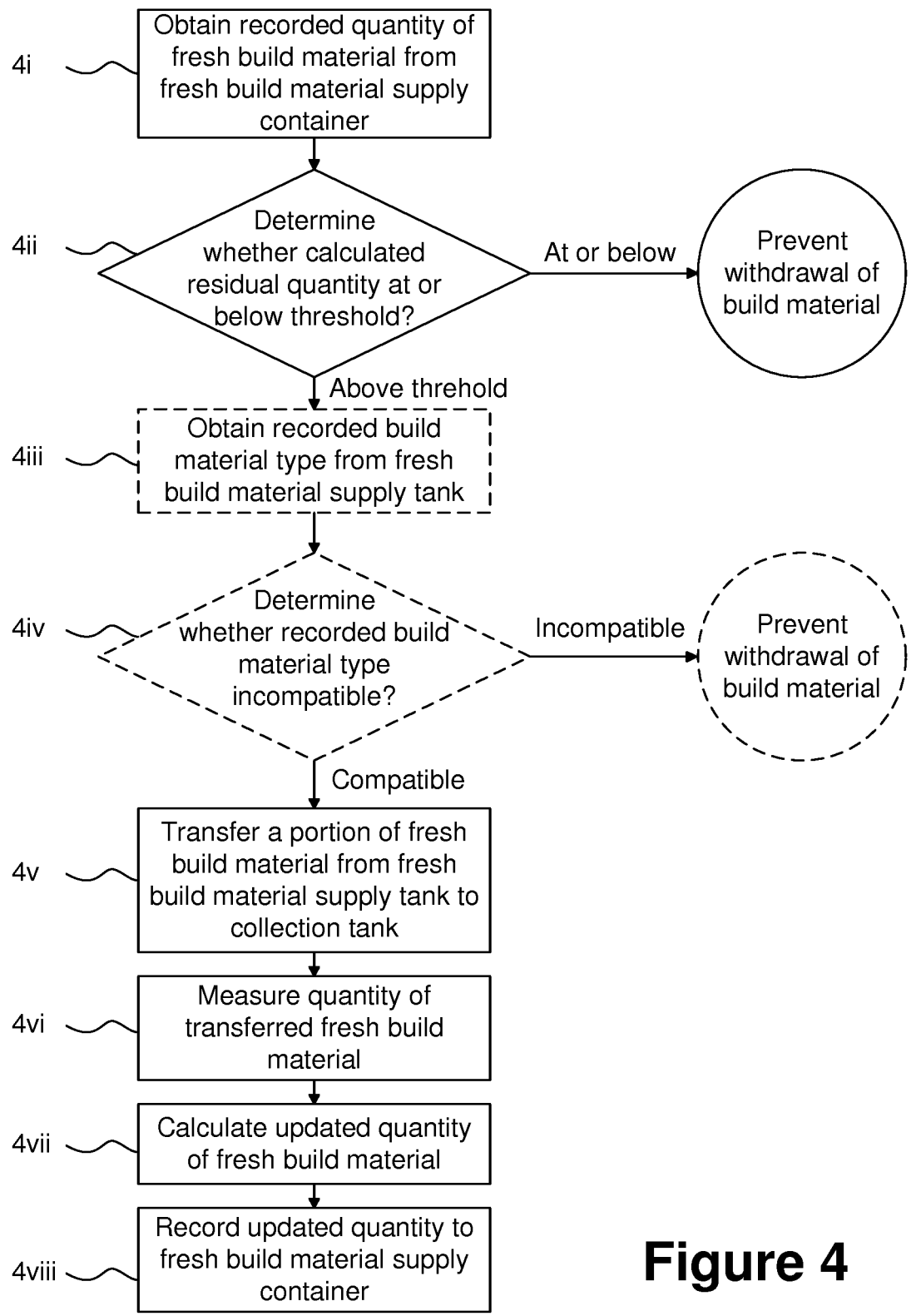
FIG. 4 shows a flow diagram outlining a method of managing additive manufacturing material according to an example.

FIG. 4 is a flow diagram outlining a method of managing additive manufacturing material according to one example:

- At 4*i*, a quantity (e.g. a weight) of fresh build material 315 associated with the fresh build material supply tank 314 is obtained.
- At 4*ii*, it is determined whether the recorded quantity is at or below a threshold level (e.g. zero), and if it is at or below that threshold level, the withdrawal of fresh build material 315 from within the fresh build material supply tank 314 is prevented.
- At 4*iii* (not required in all embodiments), a build material type that has been recorded to the data memory chip 394 of the fresh build material supply tank 314 is obtained.
- At 4*iv* (not required in all embodiments), it is determined whether the recorded build material type is incompatible with the 3D printer 104, and if it is incompatible, the withdrawal of fresh build material 315 from within the fresh build material supply tank 314 is prevented.
- At 4*v*, a portion of fresh build material 315 from the fresh build material supply tank 314 is transferred to a collection tank 312. This may be via a supply conduit 382 extending between the fresh build material supply tank 314 and the collection tank 312.
- At 4*vi*, a quantity of build material within the collection tank 312 is measured using a quantity sensor 390 (e.g. weight sensor). The build material within the collection tank 312 may include only fresh build material, or may include both fresh build material and recyclable build material.
- At 4*vii*, the measured quantity of build material transferred to the collection tank 312 from the fresh build material supply tank 314 is used to calculate an updated quantity of fresh build material 315 remaining in the fresh build material supply tank. The initial weight of fresh build material 315 in the fresh build material supply tank 314 may be used to help calculate the remaining fresh build material in the fresh build material supply tank.
- At 4*viii*, an updated quantity of build material associated with the fresh build material supply tank 314 is recorded to the fresh build material supply tank.

Figure 5:
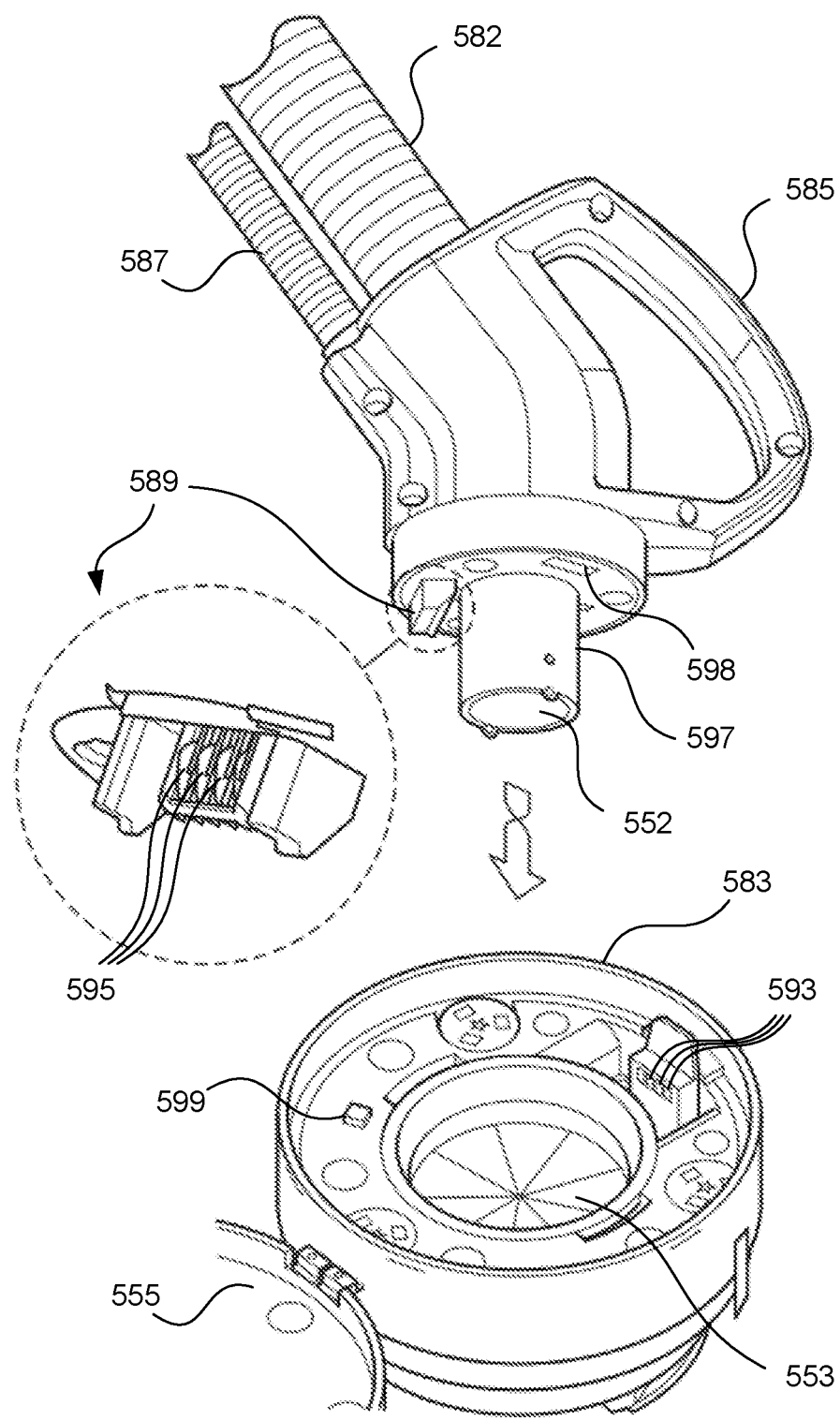
FIG. 5 schematically illustrates a tank connector and fresh build material supply tank port according to an example.

The example of FIG. 5 schematically illustrates a tank connector 585 and a fresh build material tank port 583 of a fresh build material supply tank, with which it forms a mating fit.

The tank connector 585 is an integrated connector, at which both the build material supply conduit 582 and data communication cable 587 terminate. The provision of an integrated tank connector 585 enables rapid and convenient connection to the fresh build material supply tank, enabling mechanical coupling of the build material supply conduit 582 to the interior of the fresh build material supply tank 314, and enabling electrical coupling of the data communication cable 587 and data processor 392 of the material management station 306 to the data memory chip of the fresh build material supply tank. The tank connector 585 is ergonomically designed to fit the hand of a user, with a handle for the user to grasp during connection and disconnection. The tank connector 585 has a nozzle 597 that projects into the tank port 583 of the fresh build material supply tank 314 in use, at the end of which it is provided with a closable butterfly valve 552. In use, the nozzle 597 may be retained in the tank port 583 by a friction (i.e. an interference fit) or alternatively by a detachable engagement mechanism (not shown).

The tank port 583 (which is shown independently of the remainder of the fresh build material supply tank, in FIG. 5) of the fresh build material supply tank 314 has an aperture for receiving the nozzle 597, which is provided with a tank port valve 553 to close the interior of the fresh build supply tank. The tank port valve 553 may open automatically when the nozzle 597 is inserted. The tank port 583 is also provided with a hinged cover 555 to protect the tank port valve 553.

The tank port 583 is provided with electrode pads 593 in electrical communication with the data memory chip 394 of the fresh build material supply tank 314. The tank connector 585 has a chip reader 589 with resiliently deformable electrodes 595 (e.g. sprung electrodes) to electrically contact the electrode pads 593 of the fresh build material supply tank 314, when the tank connector 585 is connected to the tank port 583. The deformability of the resiliently deformable electrodes 595 enhances the shedding of any built-up debris (e.g. waste build material) from their surface, when the tank connector 585 is connected to the tank port 583.

The electrode pads 593 and the electrodes 595 face transversely (e.g. perpendicularly) to the insertion direction of the nozzle 597 into the aperture of the tank port 583, which enhances the shedding of any built-up debris (e.g. waste build material) from their surfaces, when the tank connector 585 is connected to the tank port 583. The shedding of any built-up debris reduces the risk of the tank connector 585 and tank port 583 becoming damaged or jamming during connection.

In the illustrated example, the electrode pads 593 and the electrodes 595 face towards or away from the nozzle 597 during nozzle insertion, reducing rotational forces on the tank connector 585, enhancing electrical connection between the electrode pads and the electrodes.

In the illustrated example, the tank connector 585 has a connection switch 598 that senses whether the tank connector is connected to the tank port 583. Additionally, the tank port 583 has a connection switch activation feature 599, which mechanically engages with the connection switch 598 when the tank connector 585 and tank port 583 are connected together. In use, the data processor 392 of the material management station 306 senses the status of the connection switch 598, and prevents writing of data to the data memory chip 394 of the fresh build material supply tank 314 when disconnection of the tank connector 585 and the tank port 583 is sensed from the connection switch 598.

In use, the data processor 392 may close the path between the pump 204 and the fresh build material supply tank 214*a*, 214*b*, 314, preventing the provision of negative pressure (reduced pressure) open to air, when disconnection of the tank connector 585 and the tank port 583 is sensed from the connection switch 598.

The data processor 392 of the material management station 306 identifies any interruption in the data communication between the material management station and the data memory chip 394 of the fresh build material supply tank 214a, 214b, 314. In use, the data processor 392 may close the path between the pump 204 and the fresh build material supply tank 214a, 214b, 314, preventing the provision of negative pressure open to air, when interruption in data communication between the material management station 306 and the data memory chip 394 of the fresh build material supply tank 214a, 214b, 314 is identified.

The path between the pump 204 and the fresh build material supply tank 214a, 214b, 314 may be closed, for example, by closing the material supply tank cartridge-to-mixer valve 252a or 252b (associated with the respective material supply tank 214a or 214b, 314), the mixer-to-pump valve 254 in the seventh conduit 284 between the mixing tank 212 and the pump 204, or the valve 252a, 252b, 552 of the supply conduit 382, 282, 582.

When interruption data writing to the data memory chip 394 occurs, the data processor 392 may complete data writing to the data memory chip 394, or undertake corrective data writing to the data memory chip 394, when the tank connector 585 and the tank port 583 are reconnected. This may prevent the loss of data, and the presence of corrupted or erroneous data on the data memory chip 394.

The invention claimed is:

1. An additive manufacturing material management station, comprising:
    a build material supply conduit to connect between a management station body and a build material supply container, the conduit comprising a supply connector to releasably couple the conduit to the build material supply container; and
    a station data processor,
    wherein the supply connector comprises:
    a connector body;
    a suction nozzle projecting from the connector body to form a mating fit with an outlet of the build material supply container in use;
    a data communicator to provide data communication between the station data processor and a data memory chip of the build material supply container; and
    a connection switch configured to sense whether the supply connector is connected to the outlet of the build material supply container, the connection switch being configured to cause the station data processor to prevent writing of data to the data memory chip when disconnection of the supply connector from the outlet of the build material supply container is sensed.

2. A management station as claimed in claim 1, wherein the data communicator comprises an electrode to contact a corresponding electrode pad of the supply container to provide the data communication between the station data processor and the data memory chip.

3. A management station as claimed in claim 2, wherein the electrode is a resiliently deformable electrode.

4. A management station as claimed in claim 2, wherein the suction nozzle has a length along which build material passes in use, the data communicator comprises a face on which a plurality of electrodes, comprising the electrode, are provided in a line, and the line is orientated transversely to the length of the suction nozzle.

5. A management station as claimed in claim 4, wherein the line is orientated perpendicular to the length of the suction nozzle.

6. A management station as claimed in claim 5, wherein the face is orientated towards the suction nozzle.

7. A management station as claimed in claim 2, wherein the suction nozzle has a length along which build material passes in use, and the electrode is provided on a housing that projects from the connector body proximate to the suction nozzle and parallel with the suction nozzle.

8. A management station as claimed in claim 1, wherein the data communicator comprises a radio frequency transceiver.

9. A management station as claimed in claim 1, comprising a data conduit extending between the supply connector body and the management station body to communicate data between the build material supply container and the station data processor.

10. A management station as claimed in claim 1, wherein the management station comprises a pump to provide negative pressure connectable to the suction nozzle to withdraw build material from the build material supply container, and
    wherein the station data processor is provided to control the provision of negative pressure to a suction end of the suction nozzle of the build material supply conduit when disconnection between the supply connector and the build material supply container is sensed.

11. A management station as claimed in claim 1, wherein the suction nozzle comprises a negative pressure supply valve to control a provision of negative pressure to a suction end of the suction nozzle to control the withdrawal of build material from the build material supply container.

12. A management station as claimed in claim 1, wherein the supply connector comprises a handle projecting from the connector body.

13. A management station as claimed in claim 1, further comprising a butterfly valve in the suction nozzle.

14. A management station as claimed in claim 1, the build material supply container further comprising a tank port valve to automatically open when the suction nozzle is inserted in the build material supply container.

15. A management station as claimed in claim 1, wherein the station data processor is to prevent writing of data to the data memory chip in response to a change in the status of the connection switch indicating mechanical disconnection between the supply connector and the build material supply container.

* * * * *